June 14, 1932. H. W. HANAN 1,863,112

SULKY

Filed Nov. 13, 1928

INVENTOR
H. W. Hanan
BY John McGlone
ATTORNEY

Patented June 14, 1932

1,863,112

UNITED STATES PATENT OFFICE

HERBERT WILMER HANAN, OF BROOKLYN, NEW YORK

SULKY

Application filed November 13, 1928. Serial No. 319,031.

This invention relates to a sulky of the type used in racing and especially to a method and means for reducing friction and wind resistance therein.

A two-wheeled sulky of the type now used in racing presents considerable area to the wind and thereby reduces the speed of the vehicle, in spite of the fact that it is only an open framework of light metallic parts. Furthermore, the speed is reduced by the friction losses caused by the wheels, which losses arise not only from the axle bearings, but also from the unevenness of the surface of the road over which the vehicle is being drawn. The speed is also reduced by the wind resistance of the spokes of each wheel.

In my application, Serial No. 741,394, filed October 3, 1924, which issued on November 13, 1928, as Patent No. 1,691,390, there is disclosed a means for minimizing the loss in speed due to wind resistance by reducing the area of the sulky framework that is presented to the wind, and, also, in reducing the friction created by the wheels. These results are obtained largely by the employment of a single running wheel in combination with a framework of novel design, the sulky being characterized not only by lightness but also by strength and rigidity.

In order to stabilize a sulky of the type disclosed in the said patent it is desirable to maintain the center of gravity of the sulky and driver at the lowest point practicable. This desired result is largely attained by positioning the stirrups of the sulky as close to the ground as they may reasonably be placed, still maintaining such clearance as is necessary to avoid striking the ground when the sulky leans to one side or the other in rounding curves at great speed. A stirrup, so positioned, is shown in the said patent.

Experience has shown that it is desirable not only to have the stirrups hung from a low point upon the framework of the sulky, but also that the stirrups should be adjustable so as to suit the convenience of drivers of different heights.

One of the objects of this invention is to provide a stirrup intended for attachment to a sulky, which stirrup is capable of adjustment in one or more directions, and of being firmly held in a desired position. Another object of the invention is to provide adequate knee-room for the driver of a single wheel sulky, particularly one equipped with an adjustable type of stirrup.

Figure 1:
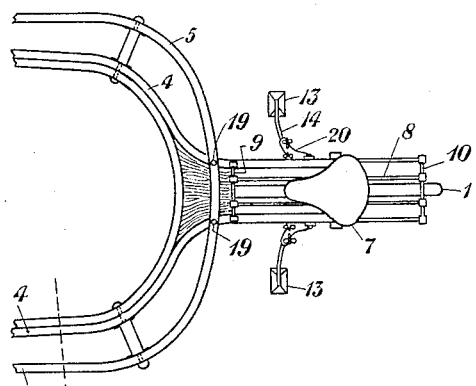
Figure 2:
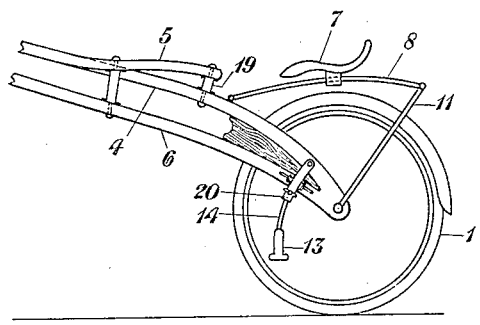
Figure 3:
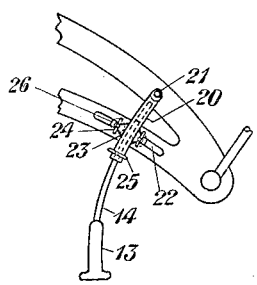

Other objects of this invention will be apparent from the following description when read in connection with the attached drawing, of which Figure 1 is a plan view of the sulky embodying my invention; Fig. 2 is a side elevation of the sulky; Fig. 3 is a fragment slightly enlarged of the side view as shown in Fig. 2 showing in detail the adjustable stirrup.

In Figure 1, which is a plan view of the sulky is shown a single wheel 1, which is the running wheel of the vehicle. This running wheel, which may be of the disc type or of the ordinary bicycle type, is supported by an axle, the bearings for which are located in the members constituting the rear end of the frame of the sulky. Any form of bearing may be used, but in order to reduce friction a ball or roller bearing is preferable.

While the framework of the sulky comprises what may be termed the body and also the shafts, no clear line of division exists structurally between these parts. The members that form the shafts are so bent and proportioned as to form the body, thus making the framework of the sulky a unitary, rigid structure. The shafts should be of such length that the hind feet of the horse will not come in contact with the running wheel 1. Each shaft is made up of a plurality of members extending from a point near the forward end of the shaft to the rear of the said shaft and continuing on to form the body of the sulky. As shown in the said patent the members are bound closely together near the forward part of each shaft, and are spread apart as they extend away from the front ends of the shafts and are maintained thus spread throughout the body portion; and, in the arrangement shown in the said patent, all of the shaft members are gradually brought together at or near the point where the axle of the running wheel is supported. In the plan view, which Fig. 1 represents, only the members 4 and 5 appear, but as will be seen from Fig. 2, another member 6 extends in substantially the same vertical plane as the member 4.

When the member 5 is carried downwards to the axle of the running wheel together with the other members 4 and 6 it renders it impracticable for the driver to keep his knees near the center of the sulky. Such a position is not only uncomfortable for the driver but also tends to lessen the stability of the vehicle. The present invention is an improvement on that shown in the said patent, which consists in bending the member 5 upwards and carrying it over the members 4 as shown clearly in Figs. 1 and 2. The raising of the member 5 permits the driver to place his knees under the member 5 and to press them against the members 4 and 6, thus enabling the driver to assume a position similar to that of a rider of a horse, and helping the driver to hold himself firmly in the sulky, whereby the stability of the driver and the sulky is increased. The member 5 is preferably continuous and unbroken from a point near the front end of one shaft to a similar point near the front end of the other shaft. To insure rigidity of the structure the member 5 is rigidly fastened to the upper members 4 on each side of the sulky. The fastening device 19 consists of a spreading member through which passes a bolt that extends through the members 5 and 4. The structure is thus made rigid and at the same time adequate separation of the members is obtained.

While any of a number of devices may be used for holding the shaft members apart, a desirable form is shown in the said patent, consisting of a spreader having three sides and having sockets at the corners thereof which conform to the surface of the members which are braced apart. A bolt forming part of each socket extends through the member, and is secured by a nut on the outer end. Other ways within the scope of this invention will suggest themselves to any one skilled in the art. It will be seen that by means of a trussed structure the framework offers great resistance to bending and thus a high degree of rigidity or stiffness of the entire framework is obtained. None of the single wheeled sulkies of the prior art shows any arrangement for rendering the entire framework rigid from the forward end of the shafts to the running wheel, and for this reason it is believed that such vehicles were unsuccessful. While I have shown the use of wood inserted between the members for the purpose of bracing the body, it is to be understood that other forms of bracing could be used, as for example, a latticework of metal, such as the light, strong alloys used in airplane construction. The saddle 7 may preferably be supported by a springy structure in the manner shown schematically in Figs. 1 and 2. This saddle is movably supported by two rods 8 which have the requisite springiness to render the saddle free from shocks and vibrations. These rods are supported at their two ends by cross members 9 and 10, the forward cross member 9 being supported by the members 4 of the framework of the sulky and the rear cross member 10 being supported by the struts 11 and 12, extending to and connected with the framework at or near the point of support of the rear axle, as shown clearly in Fig. 2. Vertical adjustment of the saddle may also be provided in well known ways, but it is felt that in general the horizontal adjustment will suffice. While a saddle is mentioned, it is to be understood that any form of seat may be used in connection with this sulky.

In order to accommodate drivers of different heights an adjustable type of stirrup is provided. The position of the stirrup in relation to the other parts of the sulky is clearly shown in Fig. 2 and the details of the stirrup are shown in slightly enlarged form in Fig. 3. This stirrup comprises a tube or sleeve 20, into which fits the rod 14 to which the stirrup 13 is attached. The rod 14 is preferably of square cross-section and likewise the hole in the sleeve 20 with which the said rod coacts, is of similar cross-section, thereby preventing rotation of the stirrup. The stirrup is thus enabled to be moved up and down and held in any desired position by means of a bolt 25 or its equivalent. Lateral adjustment of the stirrup may be effected by movement of the sleeve 20 in the slot 22. The sleeve 20 has on each side thereof a fin 23, through which passes a bolt having a wing-nut 24. The bolt extends through the slot and through the fin of the sleeve 20, the head of the said bolt being on the side of the slot opposite to that against which the fin rests. The sleeve 20 may thus be moved along the slot and held fixedly at any desired point thereon by tightening the wing-nuts. The slot 22 must of course be proportioned to provide for the radial action of the sleeve 20 which is pivoted to the member 4 at the point 21.

It will be seen that by means of a stirrup embodying the principle of that described hereinbefore adjustments can be made which will enable drivers of different heights when riding upon the sulky to occupy that position which is most natural to them and which therefore tends to increase the stability of both the driver and the sulky.

While this invention has been disclosed as embodied in a particular form it is to be understood that the form may be varied without going beyond the scope of the claims.

What is claimed is:

1. Shafts for a vehicle, each comprising a plurality of members, certain of said members being closely bound to one of the said members near the forward end thereof, and extending rearwardly from the junction point thereof, the said members gradually spreading apart and being firmly held in such position, one of said members of each shaft crossing over the other members of its respective shaft at the rear end of the said shafts, the said crossing members being joined at the said rear end.

2. Shafts for a vehicle, each comprising a plurality of members, one of which is common to both shafts, the said members of each shaft being closely bound together at or near the forward end of the shaft and being spread apart as they extend rearwardly, the said common member extending from the junction point of the members of one shaft to the junction point of the members of the other shaft, crossing the members of both shafts at the rear ends thereof and being rigidly fastened to the uppermost of said other members.

3. Shafts for a vehicle, each comprising a plurality of members, certain of which members are bound closely to one of the members near the forward end of the latter, the said members being gradually spread apart as they extend rearwardly and rigidly held in such position, thus constituting a trussed framework, the outer member of one trussed shaft, namely, that farthest removed from the longitudinal axis of the pair of shafts, crossing over the inner members of its respective shaft and joining the corresponding outer member of the other trussed shaft.

4. Shafts for a vehicle, each comprising three members, two of which are closely bound to the third near the forward end thereof, the said members being gradually spread apart as they extend rearwardly and being rigidly held in such position, two of said members lying in a substantially vertical plane and the other member lying outside that plane in the direction away from the longitudinal axis of the said shafts, the said other member of one shaft crossing over the other members of its respective shaft at the rear end thereof and joining the corresponding member of the said other shaft.

5. A sulky framework, having shafts comprising a plurality of longitudinal members arranged in a trussed form in which the outer member of each shaft crosses over the other members of its respective shaft near the rear end of the shafts, the said crossing members being merged so as to constitute effectively a single member, and the said other members of each shaft being extended rearwardly beyond the said crossing point and being brought together, the said extended members being rigidly fastened together to form the body of the vehicle.

6. A sulky, having a framework, a single wheel rotatably connected therewith, a seat supported substantially over the said wheel and foot-supporting means connected with the said framework and having shafts, each of which being of truss form, the outer truss member of each shaft being bent across the other members at the rear end of the said shafts so as to constitute a single continuous member for both shafts, the said other members of each shaft extending beyond and being effectively held together at a predetermined distance beyond the said crossing point to provide suitable support for the said seat, the said wheel and the said foot-supporting means.

7. A sulky, comprising a framework including shafts made up of a plurality of longitudinal members arranged in a trussed formation and a body, a seat supported by the said body, a single wheel rotatably lying in the plane of longitudinal axis of the sulky and connected with the said body, and foot-supporting means connected with the said body, the said means being adapted for adjustment in substantially vertical and horizontal directions.

8. A sulky framework comprising a pair of shafts each made up of a plurality of longitudinal members fixedly spaced so that each shaft is a substantially rigid trussed structure, one of said members of each shaft being more remote than the other members thereof from the longitudinal axis of the pair of shafts, each said more remote member being bent inwards at a point near the rear end of the shafts so as to pass across the said other members of each shaft, the said other members converging at a predetermined distance beyond the crossing point to form the body of the said sulky.

9. Shafts for a vehicle, each comprising a plurality of members, one of which is common to both shafts, the said members of each shaft being closely bound together at or near the forward end of the shafts and being spread apart as they extend rearwardly, the said common member extending from the junction point of the members of one shaft to the junction point of the members of the other shaft, crossing the members of both shafts at the rear ends thereof.

In testimony whereof, I have signed my name to this specification this 9th day of November, 1928.

HERBERT WILMER HANAN.